INVENTORS
MICHAEL LEHMACHER
BY HANS LEHMACHER

ATTORNEYS

United States Patent Office 3,676,270
Patented July 11, 1972

3,676,270
MACHINE FOR PROCESSING OF WEB STOCK, PARTICULARLY OF THERMOPLASTIC SYNTHETIC PLASTIC MATERIAL
Michael Lehmacher, Unterdorfstrasse, and Hans Lehmacher, Im Humnerich, both of 5215 Mondorf uber Troisdorf, Germany
Filed Nov. 3, 1969, Ser. No. 870,542
Claims priority, application Germany, Nov. 8, 1968, P 18 07 689.6; Sept. 12, 1969, P 19 46 269.2
Int. Cl. B32b *31/08;* B65h *17/42*
U.S. Cl. 156—553                              29 Claims

ABSTRACT OF THE DISCLOSURE

A machine in which a plastic film web, continually unwound from a supply roll passes through a film motion equalizing take-up mechanism from which it is drawn generally horizontally stepwise by advance rolls intermittently actuated to permit seam welding, severing, punching, and other film working operations—as used, for example, in manufacture of bags, sacks or other packaging—to be performed on the web while stationary, at a "tool" station subsequent to the take-up. The take-up mechanism, as a separate assembly including continuous draw rolls and swinging equalizer rolls, is mounted above and shiftably horizontally along the general web path, so that the spacing from the take-up to the tool station may be kept short for better and safer feed as permitted by the tooling used. With spaced pairs of draw rolls commonly driven by a continuous flexible chain or belt drive and establishing a reach of intermittently moved web along which one or more process step tools or stations are locatable, the first draw roll pair is also mounted on the shiftable take-up, and the flexible element is at one end supported by a rotating idler shiftable to change belt tension as required by or for the draw roll shift. By dividing the advance rolls and idler each at mid-length into aligned halves connectable to rotate unitarily and disconnectable for independent rotation and providing separate belt drives on each side, single wide webs or two distinct webs (with likewise divided tooling where appropriate) may be processed through a single two-section shiftable take-up, and with respective separately shiftable take-ups plastic film products of different lengths may be fabricated. Two spaced take-ups are disclosed along one web so that continuous-intermittent-continuous motion sequence of a web is available; also a single take-up, shiftable away from the supply roll, so that tooling may be used carrying out operations on the web while moved continuously such as slitting or cylinder printing in a machine carrying out also intermittent type operations. Also disclosed is modular construction for the take-up and for other operating sections of a film working machine.

---

The present invention is concerned with a machine for processing stock webs, particularly thermoplastic synthetic plastic films, of the type having a film motion equalizing or take-up means between a continuously operating film-advancing draw mechanism and a following intermittently operating film-advancing draw mechanism providing intermittent motion so that operations such as transverse severing and seam welding may be performed on the web while stationary, or between such mechanisms in the reverse sequence.

For convenience in the following discussion and description of film web handling machines and mechanisms therein, components, elements, mechanisms or regions are referred to as "first," "second," "third," "before," "after" or like terms of sequential or positional relationship to indicate the order or relative positions as such described items are encountered by film web advancing through the machine. Also for simplicity various operations performed upon plastic film or webs, such as seaming, welding, severance, slitting, punching, incising, folding, printing and the like are comprehended within the terms "film working" or "film processing," and the term "tools," "tooling," "film working devices or mechanisms" comprehend the means for carrying out such operations.

In prior plastic film web processing machines of the character here described performing operations such as severing and welding, the film web, as it is continually unwound from a supply roll, first enters a film motion equalizing mechanism including, for example, a film swing as equalizing means, to effect an equalization or averaging or smoothing out between the continuous feed and intermittent working of the film, because the film working devices or processing mechanisms, such as severing and welding mechanisms, are operated in timed relation. Because hitherto the aforementioned motion equalizer or take-up has always been disposed at the film entrance or supply end of the machine, since the films after leaving the motion equalizer are further advanced intermittently, accordingly the films are operated upon over the entire film reach subsequent to the equalizer with intermittently functioning tools such as severing and welding mechanisms to process them, for example, into bags, sacks or similar packaging.

Although many of the processing or work steps thus carried out likewise can be performed under appropriate circumstances with continuously moved stock webs, still in such machines in consequence of the stepwise advance of the film and location of the take-up, only an intermittent action or operation of the processing devices is possible. Often as a further disadvantage, the distance between the motion equalizer and the processing tools is quite great, and since the film advance or draw rolls are located in a region close to the working tools, the drawing forces applied at spaced locations are exerted over correspondingly long film reaches.

In this situation the film reaches of corresponding lengths elongate more, and also exhibit a greater tendency to tearing, than films of shorter length. Through such prior machine construction there also arise inaccuracies or unevenness in the film feed which must be balanced out again through special controls. To that end the advance rolls are designed and constructed to serve also as correction rolls, usually operating in combination with a photocell control system sensing printed marks or spots on the film.

The present invention has the general object of overcoming the disadvantages of prior film severing and welding machines or similar machines, and to provide a machine which affords other advantageous characteristics, more particularly enabling use, along with intermittently operating film processing tools, also of such tools or devices as are in constant engagement with the film web or as work a continually moved web. A further object is to provide a severing and welding or similar film processing machine which is simpler in its construction and of lower cost in its manufacture than prior machines of similar nature.

For the attainment of such objects in a machine of the character described, according to the invention it is proposed first that the film web take-up or motion equalizing mechanism be disposed selectively or adjustably in its spacing relative to the point where the web is fed from the supply rolls or relative to the film processing or working mechanisms therein, or that take-up means be disposed adjustably relative to both of these; and preferably that the motion equalizing mechanism be disposable at any desired useful location within the entire machine. To the extent that the entire machine embodies only simple severing and welding mechanism as film working apparatus or tools, then the motion equalizer is disposed as near as possible to the region of these film working or processing devices, so that the associated film advance mechanisms, which in general are intermittently rotating draw rolls, apply tensioning forces only upon a film reach of a correspondingly shorter length. In addition to this attained advantage, through this adjustable disposition of the motion equalizer also an enire machine of shorter length can be manufactured.

To the degree that immediately after the motion equalizing film swinger or take-up there are required several tool or work stations with intermittently operating tools, then the motion equalizer is disposable at the head end, that is, at the film entrance point, of the entire machine. However, to the degree that, in the course of manufacture of packaging for goods or other plastic film products, it is necessary to bring into use intermittently operating film working tools or devices, and also others continually engaging or operating on the film web, which advantageously carry out their working with or upon evenly or at least continuously advanced film, then the take-up or motion equalizer is disposable at a location in the entire machine permitting the disposition of film working tools or devices of both types on respective sides of the take-up; that is, on the web feed or web approach side, those tools which work or process the continually moved film, while on the other side, the discharge side, those which operate upon the film when it is stationary, accordingly upon intermittently moved film.

Hence there is provision for several take-up or equalizer mounting positions on the machine frame, so that the motion equalizer can accordingly selectively be shifted or displaced among or disposed at one or another position within the entire machine, either because the machine frame is set up for that purpose or the construction of the machine permits it. The displacement can be achieved either stepwise or in stepless manner. Particularly advantageous is the expedient, in accordance with the invention, that the motion equalizing mechanism be based and displaceably mounted on a guiding support for which purpose it can be provided with a slide or with rollers.

For this purpose the motion equalizing mechanism advantageously is disposed above the plane of general advance of the stock web to be worked.

Further in accordance with the invention, the motion equalizing mechanism may constitute a separate unit or constructional assembly or module which selectively can be assembled in different positions with other modules or assemblies, which, for example, contain film working tools or film feed or drive devices; and this is particularly advantageous, since now the entire machine can be made long or short, with length established by requirements of the products to be made.

Finally it is proposed that two motion equalizers associated with a film web path be so mounted as to be disposable in variable spacing from each other along the web path. Thereby a film web to be processed can, in the region before its entrance into the first motion equalizer, be first subjected to tools performing their particular functions on continuously moved film web; immediately after the first equalizer be subjected to the action of tools which are brought into operation upon the stationary film web, and accordingly upon a portion of the web intermittently moved; while after the second motion equalizer again appropriate tools can be brought into operation on a continually moved portion of the film web.

Through this expedient of disposing the two film take-ups or motion equalizers adjustably in their spacing, or to like purpose building them as separate constructional modules or assemblies in a machine of modular construction, there is now enabled the provision of a severing and welding machine capable of work hitherto looked upon as not possible of performance in or through a single machine; namely, processing a film web which in one machine region is worked continually and in another region worked intermittently.

By a further inventive proposal, in the film take-up or motion equalizer, the equalizing rolls are mounted in a swinging or oscillating frame of which the central or average position of oscillation is vertically disposed so that advantageously the equalizing rolls do not exert on the film web any force, or certainly no noteworthy force, which is conditioned through their weight.

By a further proposal in accordance with the invention, a machine may include a first film advancing draw roll pair which is adjustably settable in its spacing in a direction longitudinal of the stock web path with respect to a subsequent second draw roll pair, thereby advantageously obtaining a further relieving of the force load on the film web; and then particularly advantageously is the first roll pair secured to the longitudinally displaceable motion equalizing mechanism.

Here, moreover, these two relatively adjustable intermittent film advancing draw roll pairs may have a common drive, obtained, for example, through an endless flexible element type drive, e.g. a chain or belt drive, which at one end passes around one roll of the draw roll pair and at the other end around a reversing guide roll preferably serving also as a tension roll, with the upper reach of the flexible drive element led in S-form or shape between the two rolls of the first draw roll pair; the rolls of the first pair being disposed in a horizontal plane. Such a drive element can be comprised of a reinforced rubber or synthetic belt toothed on both sides.

The driving chain or belt may engage outboard or exposed ends of the rolls, e.g., suitable sheaves or toothed wheels on the roll ends; and particularly advantageously the drive system includes two chain or belt elements engaging respective ends of each of the rolls.

It is to be understood that a machine embodying the invention may at times have a doubled or two-fold, parallel disposition inasmuch as two separate film webs can be processed next to one another upon one and the same machine. Thus in a further inventive modification, the rolls are divided in a known manner at about half their length with the sections of each connectable and disconnectable by known means, and accordingly rotatable jointly or separately with different peripheral velocities. So also other functional mechanisms may be correspondingly divided for optional operation on a wide web or separate webs.

In a disclosed embodiment of the invention, paired divided roll halves or sections of the first draw roll pair are displaceable independently of one another. Also in the immediate region of the welding and/or severing apparatus the two divided draw rolls can be provided with a power transmission to a similarly divided welding roll arrangement; in a specific arrangement, the two outboard ends of the divided lower draw roll being provided with a power transmission cooperating with an associated power or force transmission on the ends of the divided welding roll; particularly advantageously the two outboard ends of the divided draw rolls being provided with a drive motor. Also the welding bar or beam may be divided; and the two halves of the welding beam and/or of the draw roll may be connectable.

The proposal, likewise to divide the welding roll and to associate each of its halves with a separate drive derived from the divided draw rolls, enables the further tension-free welding of synthetic plastic film webs and simultaneously a constructional simplification. Dividing the welding roll and separately driving its two halves from the draw roll halves permits not only use of a lighter drive construction but leads also to a symmetrical force application.

It is contemplated that the two draw roll halves can at times be coupled with one another, and so also the two welding roll halves, and consequently also that in both cases the two united roll halves can be driven from one outboard end. The inventive proposals accordingly afford multiple adaptability to the requirements of film processing, whether there is to be processed a film web of such width that it extends over the total roll length of the described divided roll halves, or two parallel webs are to be worked disposed parallel next to one another, and in the latter case with the two webs to be worked into products (such as bags, sacks, or the like sections) of differing lengths.

The invention is further explained in relation to the drawings; and other objects and advantages will appear from the following description and the drawings wherein.

Figure 1:
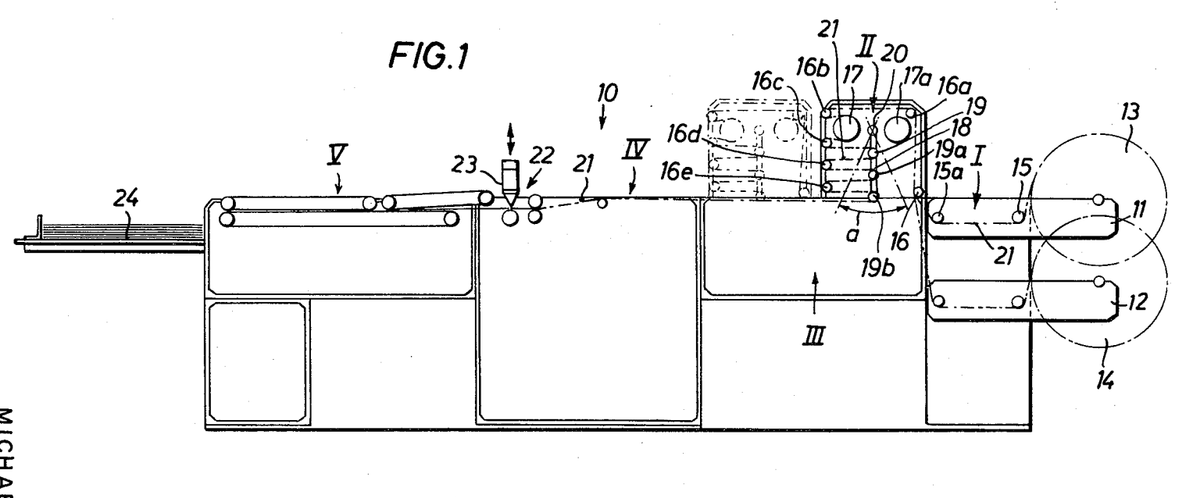
FIG. 1 is a side view of a severing and welding machine in accordance with the invention.

In drawing FIG. 1, the film severing and seam welding machine 10 is composed of five structural and functional assemblies or modules: a film supply unit I; a film take-up or motion equalizer unit II; a third unit or assembly III embodying, supporting or mounting one or more film working tools or devices at respective processing stations along the film web path; a fourth structural unit IV including film severance and welding mechanism or tooling 22; and a fifth structural unit V to deliver, to the stacking table or tray 24 at the left of the discharge end of the machine, the product (such as bags or sacks, for example) fabricated in the machine from a web of single ply, multi-ply, or flattened tubular plastic film stock, supplied in rolls at 13 and/or 14. In the units I or II, certain film working operations could also be carried out where appropriate tooling is provided.

By modular design, the units I, III, IV and V may be juxtaposed and joined in various sequences, and when so placed provide a longitudinal generally horizontal path for the web, and further provide on the top regions thereof mounting means for selective positioning of unit II above the web path.

The web or continuous film stock ("web" as here used comprehending single ply or multiple ply or flattened tubular type synthetic thermoplastic film stock web depending upon the product type and its design) progresses longitudinally through the machine when in operation from right to left as seen in FIG. 1, with local deflections from a generally horizontal path. Sequences of stations or components in numerical order or like relative designations are considered as beginning at the film supply at the right end.

In the first module or unit I there are two supports or brackets with shafts or bars on which are rotatably disposed the film supply or stock rolls 13 and 14, from which the film is unwound as a continuous sheet or web passing about the direction changing guide or idler rollers 15 and 15a and delivered to the second unit II, comprising a film take-up or motion equalizing mechanism of a "horizontal festooning" or a "film swing" type and also web drive means for continuous withdrawal of the film from the supply rolls. However, the whole assembly represented by unit II will usually be referred to as the film take-up or motion equalizer mechanism.

The web of film 21 to be processed, which is unwound from the supply rolls 13 and 14 (or as also may be the case, where flattened tubular film stock is processed, taken from a single supply roll 13), in passing along its web moving direction from right to left, from the end of the film take-up unit II passes over the remaining space of the third unit III, in which further required film working tools or mechanisms may be present, and into the unit IV which includes the severing and welding tooling or mechanism 22.

The latter mechanism in the particular example or embodiment is comprised of a transversely extending welding bar or beam 22, vertically reciprocatable as indicated by the arrow, and having a cutting knife extending transverse to the web path. Through this latter tooling, performing seam welding and transverse severance operations and acting intermittently on the web 21 while stationary, there are fabricated, for example, bags or sacks either from a flattened tubular film stock or from separate superimposed film layers as a two-ply web. These product bags, after passing the severance and welding mechanism in the unit IV, reach the unit V, which draws the individual bags or sacks out of the severing and welding mechanism and brings them upon the stacking table 24 attached to the unit V.

This assembly or unit II contains, as a continuously driving mechanism for the web, the fixed idler or guide rollers 16, 16a, 16b, and 16c, and between rollers 16b and 16c, the web drive roll 17, about which the film web is carried; roller 17 being driven through the driving motor or gear-motor unit 17a, with the roll 16c serving as a roll both in the specific web take-up, and in the web drive.

The mechanism which in strict sense is the film take-up or motion equalizer mechanism (see also the hereinafter described FIG. 3 or FIG. 4) is comprised of the fixed idler guide rollers 16c, 16d, 16e, and film oscillating or "swing" means including swinging frame means 18 in which the rotatable "equalizer" rolls 19, 19a and 19b (or shafts thereof) are mounted at their ends; the frame means depending from and swinging about a horizontal shaft or axle 20. The film passes generally horizontally back and forth between 16c, 19, 16d, 19a, 16e and 19b, and from 19b as a discharge roll to the left from the unit II.

The motion equalizing mechanism of the film oscillator type in unit II fulfills the known and obvious requirement of providing a motion equalization for the film web 21, between the portion continually drawn from the supply rolls 13 and 14 and that moved intermittently in the region of the severing and welding mechanism in unit IV.

The oscillating frame in the equalizer device swings or oscillates on the axle 20 through an angle $a$, and at its middle or average position is vertical. Consequently the oscillating equalizing rolls 19–19b exert no forces or no noteworthy forces through their own intrinsic weight acting directly on the stock web, in contrast, for example, to vertically moveable rolls bearing directly on a web in prior, vertical, festooning arrangements.

Moreover, this arrangement, in a simple fashion, enables introduction of freshly extruded tube or single ply film webs directly into the motion equalizing unit II.

Figure 2:
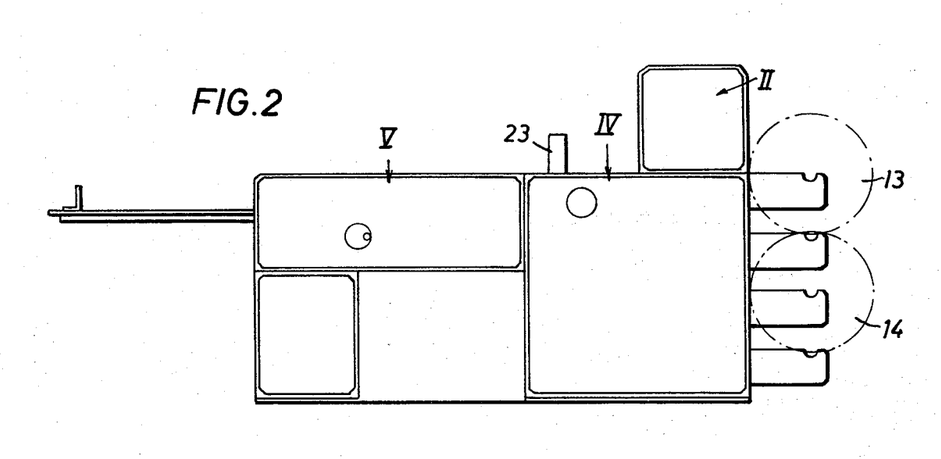
FIG. 2 is a side view of a further severing and welding machine representing a modification of or variation from FIG. 1.

To keep the intermittently moved length of the film web short the motion equalizing mechanism is disposed displaceably and adjustably in its spacing relative to the point of film entrance into the machine, that is, in the particular embodiment of FIGS. 1 and 2, it is displaceable away from the rolls 13–14 towards the film working tools or processing mechanisms.

This is here achieved by constructing the motion equalizer as a separate unit II which can, for example, be disposed also in the location represented by the dotted lines, or in any intermediate position or which can be slid into any such locations.

For this purpose the frames or top beams or like supports in the units I, III or IV can be provided with prearranged mounts so that the motion equalizer module can be mounted in desired positions on one or another of these units; but particularly advantageously these structural units or the total assembly of such units into a machine is provided with rails or slideways upon which the unit or module II is slideable for displaceability either in stepless manner or in pre-determined increments.

This mounting of the motion equalizing device, in a separate unit locatable at every desired useful position in the entire machine and additionally above the path of the stock web to be processed, allows manifold variations in the design, overall construction and set up of a severing welding machine.

In FIG. 2, for simplicity of representation the details of web conveying elements apparent in FIG. 1 are either not shown or shown schematically as is the severing and welding tooling; and the machine has unit II as the motion equalizer mounted on the unit IV, and a shorter length construction than that of FIG. 1.

However, it is to be understood that in the machine represented in FIG. 1, there also the motion equalizing device or unit II could be disposed on the unit IV comprising the severing and welding tooling to the degree that this is useful or there might be sufficient room to include film working tooling or processing mechanism for operation on the film web, that is, along the path between the motion equalizer and the draw rolls associated with the severing welding tooling.

Two motion equalizer units II can also be disposed on each web path, for example, a first equalizer disposed on the unit I and a second disposed upon the severing and welding apparatus unit IV. Such an arrangement is useful when a film intermittently moved is to be processed between the two equalizing devices, and thereafter subjected to film working operations which best or necessarily are performed on continuously moved film web, and thus may be carried out beyond the second motion equalizer.

Figures 3, 4:
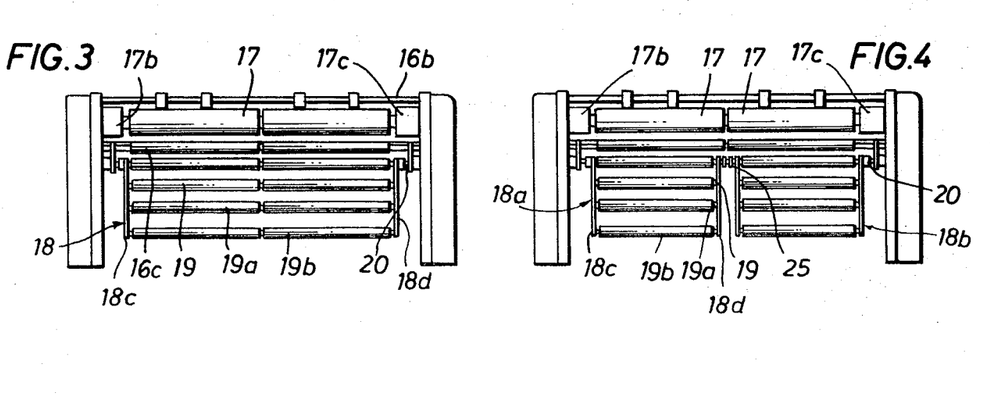
FIGS. 3 and 4 are vertical sections through the film take-up or motion equalizing mechanism.

FIGS. 3 and 4 in a vertical section show details of the film equalizing oscillator or swing assembly 18 of the unit II, but for the purpose of simplification or representation, the idler rollers 16d and 16e are not represented.

It is first observed that it is advantageous so to design the structure and suspension of the swinging or equalizing rolls 19–19b that the swing frame means arrangement of FIG. 3 can be easily substituted by one in accordance with FIG. 4, wherein the swinging frame means comprises two swing frames each supporting a respective equalizer roll set.

FIG. 3 shows the drive rolls and oscillating equalizing rolls of a construction by which not only a wide web but also two smaller webs can be handled.

The guide idler and the swing rollers could each be unitary in FIG. 3; but as shown it is useful to use idler rollers 16–16e, drive roller 17 and swing rollers 19–19b, which are divided near mid-length into half sections, i.e., comprised of two axially aligned like rolls independently rotatable, mounted if desired on a common shaft. The shafts for the rollers 19, 19a, 19b are secured at their ends in respective parallel arms 18c, 18d to form a rigid dependent frame swingable about the axis of the pivot shaft 20 passing through the upper ends of the arms, and for this purpose such shafts may be stationary with ends fixed in the arms as one expedient. The frame may be swung somewhat pendulum-wise by the operating web tensions with a gravitational bias toward a vertical position, with a spring bias added if desired, or aiding swinging impulses may be supplied from a driving mechanism timed in relation to the intermittent operations. By appropriate bearing structures, the arms 18c, 18d may be supported on the shaft 20 or the shaft 20 so supported relative to the unit housing.

The purpose of these divided rolls is that film webs can be fed through respective sets of the divided roll sections, which sets are separately controlled photoelectrically from printed images or index or guide marks imprinted on the webs. Consequently separate drive units 17b and 17c are connected to the two web drive rolls, and preferably also the equalizing rolls can be latched or connected for unitary drive; and then it is possible to cut out or uncouple one of the two drive motor units 17b and 17c for a single web drive.

FIG. 4 presents the basic arrangement of FIG. 3, with, however, what were in effect sets of divided halves of the swing rolls in FIG. 3, now separately mounted on separate shafts between respective pairs of parallel arms 18c, 18d to form and act as two shorter swing frames 18a, 18b though the latter are suspended from the compound shaft means 20 to swing about its axis; so that the equalizing rolls of the left side or frame can swing independently from those of the right side, though on or about the swing shaft means 20. The shaft means 20, however, is here also divided, but through a coupling 25 the two halves thereof can be engaged so that all swinging rolls, that is, the two frames can swing in synchronism.

Figure 5:
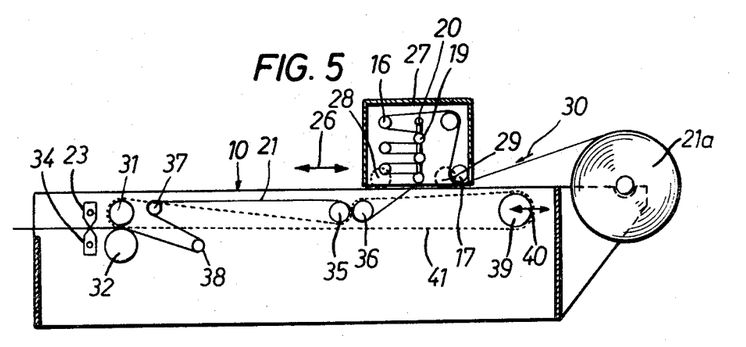
FIG. 5 represents a further machine modification in essentially schematic fashion and in vertical longitudinal section taken as indicated by the line V—V in FIG. 6.
Figure 6:
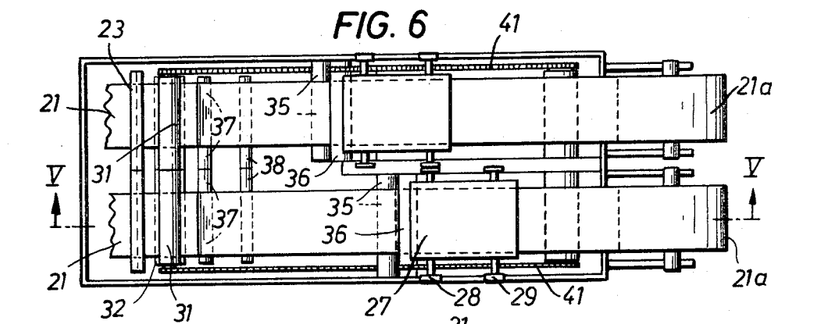
FIG. 6 is a top view of the machine of FIG. 5.

In the machine modification of FIGS. 5–6 there are provided two like longitudinally extending parallel machine sections in a common frame for handling two webs but the construction in either of these sections obviously could be used for a single web machine. The structure will be described first relative to a single section, though the drive system ultimately cooperates with both. In each section the motion equalizing device is supported within a respective housing 27 displaceable in both directions as indicated by the double arrow direction 26, by virtue of housing support through the schematically represented rollers 28 and 29 guided on a portion of the machine frame top or respective ways or rails. The film take-up swing or oscillator 18, 19, 20 is generally that explained with respect to FIG. 1; and the drive roll 17, located at the entrance to the housing, is likewise provided with a suitable drive motor unit (not designated). The film web 21, e.g., flattened tubular stock, for each section is wound off from the supply roll 21a which rests upon a support block or bracket rigidly secured to the machine frame. The web, moved in the direction indicated by the arrow 30, is continually drawn off into the front of the film take-up unit and in the region behind the take-up unit is moved intermittently.

Figure 10:
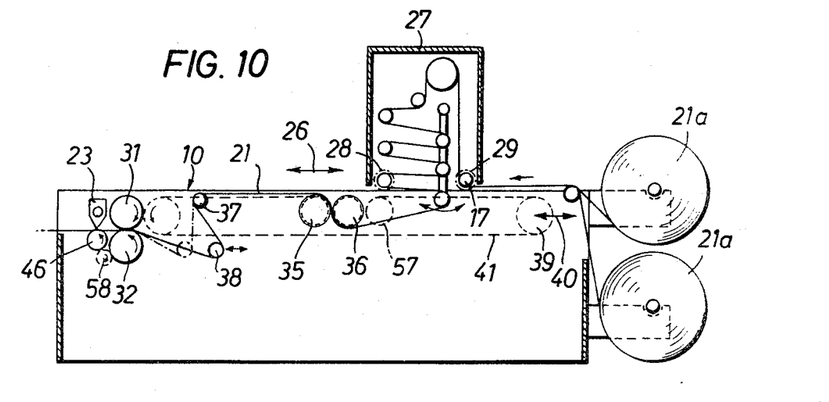
FIG. 10 represents a modification of the machine of FIG. 5, in essentially schematic fashion and in vertical longitudinal section taken as indicated by the line X—X in FIG. 11.

For the intermittent motion the web 21 is drawn through a first, horizontal draw roll pair 35–36 changeable in its spacing relative to a respective second draw roll pair comprised of upper and lower rolls 31, 32 respectively, located immediately before a welding and cutting tool or device 23, 34; which draw roll pairs are connected through a common drive hereinafter to be described. Other working or processing devices may also be present as shown in FIG. 10, for example. A vertically spaced and horizontally offset pair of idler rolls 37–38 is also provided between the first and second draw roll pairs.

Here the first roll pair 35–36, with axes in a horizontal plane, particularly advantageously is mounted on the housing 27, so that these rolls can be displaced simultaneously together with the housing.

Figures 7, 8:
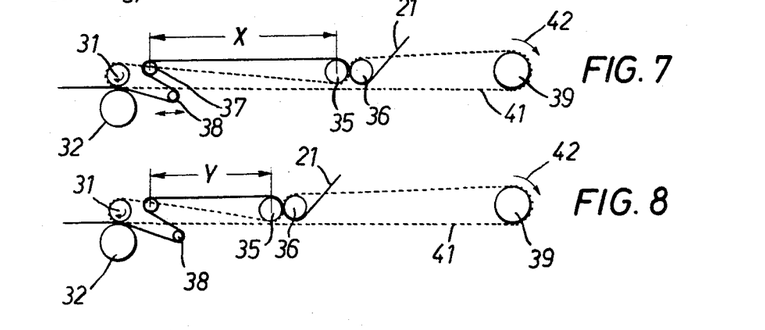
FIGS. 7 and 8 represent in schematic comparative fashion the relative displaceability of the two film advancing draw roll pairs.

FIGS. 7 and 8, schematically represent the laying or disposition of a flexible drive element 41 for the draw rolls, the path of a web through one machine section; and also, for comparison purposes, show the two intermittent web advance or draw roll pairs at differing separations or spacings, resulting beyond roll 35 in horizontal top web reach X in FIG. 7, and a shorter reach Y in FIG. 8. The film web 21, before entrance into the second vertically stacked draw roll pair 31–32 is reversed or reflected about two guide rolls 37 and 38, with the roll 38 changeable in its spacing relative to the second draw roll pair 31–32, as a means to attain compensation or adjustment of registration in combination with a photoelectric control system sensing printed marks or the like on the web.

The film web thus has a processing or working length X or Y along the reach of which further tools or film working devices may be disposed on the machine frame. The length X in FIG. 7 corresponds to the spacings appearing in FIG. 5. In FIG. 5, however, the direction reversing idler or guiding roll 38 is represented with a wider spacing from the second draw roll pair 31–32. The variable length reach is determined through the spacing of the horizontal draw roll pair 35–36 from the guide roll 37, for the spacing of the guide roll 37 relative to the advance roll pair 31–32 generally held constant for a given job set up, though 38 may be shifted for register purposes.

FIGS. 7 and 8 show a common flexible drive element 41 for, and also the roll rotational senses in, the draw roll pairs 35–36 and 31–32, and also the rotation in the reversing or return roller 39. The latter is designed and mounted for shifting in the direction indicated by the double arrow 40 in FIG. 5 thereby to serve as a tensioning roll to loosen or to tension the common flexible drive element 41 (for the two draw roll pairs) running in the arrow-indicated direction 42 in a drive system such as that described in detail in relation to FIG. 9.

Figure 9:
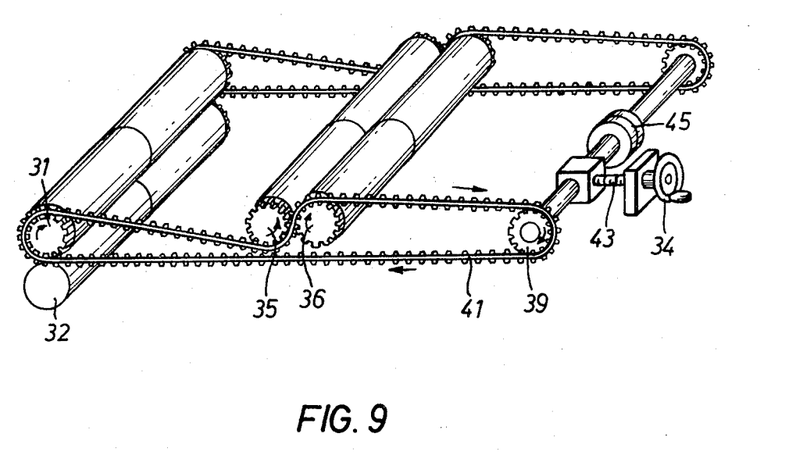
FIG. 9 is a perspective and enlarged view of a common drive for the two adjustably spaceable film advancing draw roll pairs.

The flexible drive element 41 may be a drive chain or belt, particularly advantageously a rubber or plastic wire strand reinforced drive belt toothed on both sides. The belt at the extreme ends of the system span passes semicircumferentially around the draw roll 31 and the tensioning reversal or return roll 39, and at the intermediate region its top reach is laid in an "S" form about and between the two rolls 35 and 36 of the first roll pair. The tension roll 39, through a screw spindle 43 provided with a hand operating wheel 44 or any other like or suitable known construction, is shiftable in either horizontal direction (i.e., left or right) to release or tension the belt drive.

Peripheral surfaces on the corresponding outboard ends of the rolls 31, 35, 36 and 39 are constructed with a corresponding toothing or provided with toothed wheels for engagement with the belt teeth, but with other flexible drive element forms the rollers are provided with sheaves, wheels or integral round surface portions of form appropriate to the drive element, and in the discussion of passing of the element about or its engagement with rolls, it is to be understood that engagement with these is intended.

Particularly advantageously, the rolls provided at the locations of rolls in each of the draw roll pairs 31–32 and 35–36 are not unitary, but each is divided near mid-length, to provide two roll sections which may be rotatable on a common shaft as in 31–32 or on separate shafts as shown for 35–36; and with this design or construction form, two drive belts, such as that previously described, are provided extending longitudinally of the machine and each engaging the corresponding outboard ends of respective roll sections. Between the roll sections on each shaft, a coupling is provided, so that the aligned halves or sections can be connected and disconnected. So also a coupling 45 is inserted in the shaft of the tension roll 39, i.e. the shaft of 39 being divided, so that by like option of coupling or disconnection both shaft halves may rotate unitarily or independently with different speeds for the two aligned sections. Thus by the coupling option it is possible that one section or half on a roll shaft can rotate with a greater velocity than the other half or section, or that the two roll sections rotate unitarily with a like rotational speed.

The flexible belts may be driven by a respective motor drive unit applying power to either the belt (as hereinafter disclosed relative to FIGS. 10–13) or to a fixed position roller such as roller 31 or (where this is divided) to the half sections thereof, through appropriate means interrupting the drive connection periodically as required where continuously operating motors are used, or directly where suitable intermittent motors are timed in operation.

Finally, as appears from FIG. 6, since the shafts for each roll section of 35 and for each roll section of 36 are separate, and the shafts for each adjacent parallel pair of roll sections are mounted on a respective displaceable housing 27, the draw roll sections of the first roll "pair" 35–36 can be displaced relative to one another, so that a web on one side of the machine can have a differing worked length or processing reach than the web on the other side. It is to be noted, however, that in FIGS. 5–6, the motion equalizer and continuous drives for both webs could be supported in a common housing as in FIG. 10, e.g. with a FIG. 4 type dual swing. Moreover, an adjustment or displacement of the draw roll pair 35–36 (or of the two paired roll sections) may be made during operation of the machine with this FIG. 9 drive arrangement.

FIGS. 10 to 13 show a machine modified from that of FIGS. 5–8 by enclosing, in a single roll-carriage supported housing 27, the web supply drawing and take-up means for both webs; an obvious minor modification in the supply roll supporting brackets for the rolls 21a and 21a; in the roll drive systems; and by the fact that the welding beam 23 cooperates with a rotating welding roll 46. The outboard ends of the upper draw roll 31, or of respective half sections where this is a divided roll form, have secured thereon or integrally formed therewith respective gears 47 and 48, and meshing with the latter are like gears or toothed wheels on the draw advance roll 32.

Figure 11:
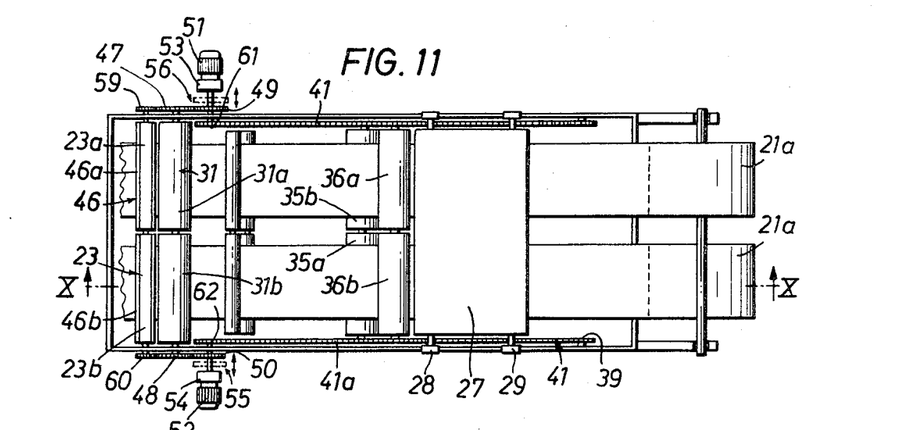
FIG. 11 is a top plan view of the apparatus of FIG. 10.
Figure 12:
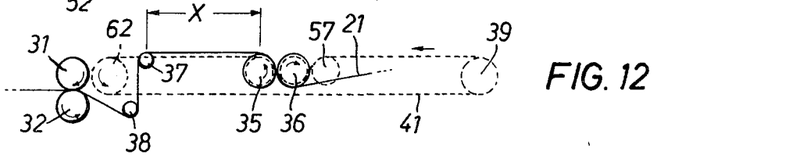
FIGS. 12 and 13 represent in schematical comparative fashion the displaceability of the two draw roll pairs of the machine of FIGS. 10 and 11.
Figure 13:
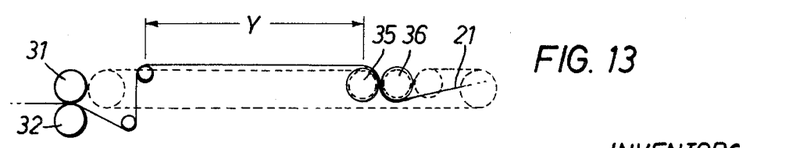

The gears 47 and 48 are driven by electric drive motors 51 and 52 with associated drives 53 and 54, and through respective gears 49 and 50 which are shiftable between their meshing positions shown in full lines and non-meshing dotted positions 55 and 56, so that the drive of a draw roll at 31 is attainable through the motor 51 or through the motor 52 or through both motors. Moreover, since the draw rolls 31 and 32 as well as 35 and 36 are divided, it is thereby possible to drive the corresponding roll halves or sections individually, and thus with different rotational speeds. On the shafts of the two motors 51 and 52, here at the left end of the belt span, there are arranged further gears 61 and 62 to drive the tooth belts 41 and 41a, in turn driving the aforementioned first draw rolls 35 and 36, with the rotational sense shown in FIG. 12 resulting.

Before the first draw roll or roll sections 36, there are also provided idler guide gears 57 changing direction of the belts 41 and 41a.

The gears (not visible in the drawings) aforementioned as present on lower roll 32 mesh with aptly disposed idler gears 58 which in turn mesh with gears 59 and 60 on the outer ends of the two sections 46a and 46b of the likewise divided welding roll means 46. Also the welding beam 23 is divided, being comprised of the two sections 23a and 23b. Thus the drive system provides the option of processing a single wide web, or two smaller webs independently driven. Obviously one wide supply roll may be mounted on either of the support bracket bars supporting the small rolls 21a. Also FIG. 10 exhibits to the right of take-up carriage 27 a straight horizontal continuously moving web reach, along which further tooling may be disposed (e.g., printing cylinders) which operate upon a moving web.

Here again the schematically indicated end roller 39 may be a tensioning device as in FIG. 9.

We claim:

1. For handling of webs of thermoplastic synthetic plastic film and the like, a severing and welding machine having a web motion equalizer or take-up mechanism between mechanisms respectively continually and intermittently advancing the web, and characterized by having the complete motion equalizer mechanism as a unit disposed selectably in a horizontal direction in its spacing relative to the intermittent film advancing mechanism, whereby the location of the equalizer mechanism may be changed to allow accommodation of other components in the machine along the web path either before or after the equalizer mechanism.

2. A machine as described in claim 1, wherein the motion equalizer mechanism is disposable on a machine frame at several securement positions.

3. Apparatus in accordance with claim 1, wherein the motion equalizer mechanism is disposed shiftably as a unit along a support in the machine.

4. A machine as described in claim 1, comprised of constructional modules including one constructional module containing the motion equalizer mechanism and including a plurality of other constructional modules containing film working tools and drives; the module including said equalizer mechanism being selectively composable in different positions with said other modules in the construction of said machine.

5. A machine in accordance with claim 1, wherein said motion equalizer mechanism is disposed above that portion of the path of the web through the machine lying outside the said equalizer mechanism.

6. A machine as described in claim 1, including a second motion equalizer mechanism, motion equalizer mechanisms being associated with one film web path in the machine and disposed changeably in their spacing relative to each other.

7. A machine in accordance with claim 1, wherein said equalizer mechanism as a unit includes means continually driving said web; the last said means comprising in said unit a continually driving roll in driving contact with said web.

8. A machine as described in claim 1, wherein said motion equalizer mechanism is comprised of a housing; dependent swing frame means swingably mounted in the housing by pivot shaft means and having a plurality of equalizing rolls rotationally disposed therein in parallel relation to each other and to the axis of swinging; the central swing position of said swing frame means being vertical; and a plurality of fixed idler rolls mounted in said housing parallel to each other and to the swing axis, and disposed for horizontal festooning of said web between said idler and equalizing rolls.

9. A machine in accordance with claim 8, wherein said equalizer mechanism includes means for continually driving said web; the last said means comprising a continually driving roll in driving contact with said web.

10. A machine as described in claim 9, wherein the driving roll and the equalizing rolls are each divided and in effect comprised of two axially aligned and engageable rolls.

11. A machine as described in claim 8 wherein the said swing frame means comprises two independently swingable swing frames each with a set of equalizing rolls, and said pivot shaft means comprises a shaft in effect divided into two aligned halves engageable through a coupling and pivotally supporting a respective said swing frame.

12. A machine as described in claim 8, wherein said swing frame means and pivot shaft means together with the said equalizing rolls comprise a connected structural unit easily removable and replaced in the machine.

13. A machine for processing of a web of thermoplastic synthetic plastic film by severing, welding, or other film working operations, and having a motion equalizing mechanism between mechanisms for respectively continually and intermittently advancing the web, said machine including in the intermittent web advancing mechanism a first pair of draw rolls and a second pair of draw rolls engaging said web, one said pair adjustable in spacing from the other pair; said motion equalizing mechanism being shiftable for selective positioning along the web path relative to the second roll pair for selective spacing therefrom.

14. A machine as described in claim 13, wherein said first roll pair is mounted on the shiftable motion equalizing mechanism.

15. A machine as described in claim 13, wherein said two draw roll pairs have a common drive.

16. A machine as described in claim 15, wherein said common drive is provided by an endless flexible drive element supported over a drive span by an idler reversing roll at one end of the span and a roll at the second end of the span with an upper reach of the drive element led in S-shape between and in driving engagement with the two rolls of the first draw roll pair.

17. A machine as described in claim 16 wherein said flexible element is in driving engagement with outboard ends of the rolls thereby driven.

18. A machine as described in claim 16, wherein the drive comprises two flexible elements engaging respective opposite ends of the driven rolls.

19. A machine as described in claim 18, wherein each of said rolls is divided at about mid-length into half sections independently rotatable with differing peripheral velocities.

20. A machine as described in claim 19, wherein the respective roll sections are engageable and disengageable.

21. A machine as described in claim 16, wherein the rolls of the first draw roll pair are disposed in a horizontal plane, and the drive element is comprised of a belt toothed on both sides.

22. A machine as described in claim 19 and adapted for simultaneous processing of two webs extending generally parallel to each other, and wherein the adjacently parallel pairs of roll sections in the first draw roll pair are displaceable independently of one another.

23. A machine as described in claim 13, including a welding roll subsequent to the second draw roll pair, and a power transmission from one of said draw roll pairs to said welding roll.

24. A machine as described in claim 15, wherein said common drive is provided by an endless flexible drive element supported over a drive span by an idler reversing roll at one end of the span and a draw roll at the second end of the span with an upper reach of the drive element led in S-shape between and in driving engagement with the two rolls of the first draw roll pair, and including, subsequent to the second draw roll pair, a divided welding roll providing aligned welding roll sections; and wherein the outside ends of two aligned roll sections in the second draw roll pair are provided with power transmission means to respective outboard ends of the welding roll sections.

25. A machine as described in claim 24 wherein the two outboard ends of the upper draw roll sections are driven respectively through associated motor drive units.

26. A machine as described in claim 24 including a welding beam divided into two sections and cooperating with said divided welding roll; the two sections of the welding beam being latchable to each other, and the aligned sections of each roll of the second draw roll pair being couplable to each other.

27. Apparatus in accordance with claim 23, wherein the said welding roll is divided near mid-length into independent roll sections.

28. A machine as described in claim 27 including a welding beam divided into sections respectively cooperating with the sections of the welding roll.

29. A machine as described in claim 25, wherein said flexible drive element is a drive belt toothed on both ends, and said motor drive units drive the drive belt and the second draw roll pair through toothed wheels.

References Cited

UNITED STATES PATENTS

| | | | |
|---|---|---|---|
| 2,341,493 | 2/1944 | Tuthill et al. | 226—114 |
| 3,148,598 | 9/1964 | Davis | 156—515 |
| 3,148,635 | 9/1964 | Reid | 226—117 |
| 3,232,508 | 2/1966 | Gruver | 226—114 |
| 3,382,132 | 5/1968 | Kugler | 156—515 |

FOREIGN PATENTS

| | | | |
|---|---|---|---|
| 681,367 | 10/1952 | Great Britain | 226—114 |

BENJAMIN A. BORCHELT, Primary Examiner

J. M. HANLEY, Assistant Examiner

U.S. Cl. X.R.

156—251, 361, 515, 113